(12) United States Patent
Martin et al.

(10) Patent No.: US 9,081,807 B2
(45) Date of Patent: *Jul. 14, 2015

(54) EVENT-DRIVEN INVALIDATION OF PAGES FOR WEB-BASED APPLICATIONS

(71) Applicant: Open Text S.A., Luxembourg (LU)

(72) Inventors: John H. Martin, Austin, TX (US);
Matthew Helgren, Austin, TX (US);
Kin-Chung Fung, Houston, TX (US);
Mark R. Scheevel, Austin, TX (US)

(73) Assignee: Open Text S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/447,082

(22) Filed: Jul. 30, 2014

(65) Prior Publication Data

US 2014/0344225 A1    Nov. 20, 2014

Related U.S. Application Data

(63) Continuation of application No. 13/620,396, filed on Sep. 14, 2012, now Pat. No. 8,832,387, which is a continuation of application No. 12/208,934, filed on Sep. 11, 2008, now Pat. No. 8,312,222, which is a
(Continued)

(51) Int. Cl.
*G06F 12/08*    (2006.01)
*G06F 17/30*    (2006.01)
*H04L 29/08*    (2006.01)

(52) U.S. Cl.
CPC .... *G06F 17/30306* (2013.01); *G06F 17/30902* (2013.01); *H04L 67/2842* (2013.01)

(58) Field of Classification Search
CPC .............. G06F 12/0815; G06F 12/08; G06F 17/30902; G06F 17/30306

USPC .......................... 711/133, 141, 106, 145, 166
See application file for complete search history.

(56) References Cited

U.S. PATENT DOCUMENTS 5,202,982 A     4/1993   Gramlich et al.
5,473,772 A    12/1995   Halliwell et al.
(Continued)

OTHER PUBLICATIONS

Chen et al., "Wormhole Caching with HTTP PUSH Method for Satellite-Based Web Content Multicast and Replication System" Workshop 99, pp. 1-14, 1999.
(Continued)

*Primary Examiner* — Pierre-Michel Bataille
(74) *Attorney, Agent, or Firm* — Sprinkle IP Law Group

(57) ABSTRACT

Systems and methods for invalidating and regenerating pages. In one embodiment, a method can include detecting content changes in a content database including various objects. The method can include causing an invalidation generator to generate an invalidation based on the modification and communicating the invalidation to a dependency manager. A cache manager can be notified that pages in a cache might be invalidated based on the modification via a page invalidation notice. In one embodiment, a method can include receiving a page invalidation notice and sending a page regeneration request to a page generator. The method can include regenerating the cached page. The method can include forwarding the regenerated page to the cache manager replacing the cached page with the regenerated page. In one embodiment, a method can include invalidating a cached page based on a content modification and regenerating pages which might depend on the modified content.

20 Claims, 7 Drawing Sheets

Related U.S. Application Data continuation-in-part of application No. 11/825,909, filed on Jul. 10, 2007, now Pat. No. 7,818,506, which is a continuation-in-part of application No. 10/733,742, filed on Dec. 11, 2003, now Pat. No. 7,360,025.

(60) Provisional application No. 60/433,408, filed on Dec. 13, 2002.

(56) References Cited

U.S. PATENT DOCUMENTS

| | | | |
|---|---|---|---|
| 5,504,879 | A | 4/1996 | Eisenberg et al. |
| 5,740,430 | A | 4/1998 | Rosenberg et al. |
| 5,946,697 | A | 8/1999 | Shen |
| 6,026,413 | A | 2/2000 | Challenger |
| 6,029,175 | A | 2/2000 | Chow et al. |
| 6,138,128 | A | 10/2000 | Perkowitz et al. |
| 6,151,607 | A | 11/2000 | Lomet |
| 6,151,624 | A | 11/2000 | Teare et al. |
| 6,178,461 | B1 | 1/2001 | Chan et al. |
| 6,192,415 | B1 | 2/2001 | Haverstock et al. |
| 6,198,824 | B1 | 3/2001 | Shambroom |
| 6,216,212 | B1 | 4/2001 | Challenger |
| 6,256,712 | B1 | 7/2001 | Challenger |
| 6,263,403 | B1 * | 7/2001 | Traynor ............ 711/133 |
| 6,272,492 | B1 | 8/2001 | Kay |
| 6,286,043 | B1 | 9/2001 | Cuomo et al. |
| 6,408,360 | B1 | 6/2002 | Chamberlain et al. |
| 6,487,641 | B1 | 11/2002 | Cusson et al. |
| 6,571,246 | B1 | 5/2003 | Anderson et al. |
| 6,591,266 | B1 * | 7/2003 | Li et al. ............ 1/1 |
| 6,615,263 | B2 | 9/2003 | Dulai et al. |
| 6,651,217 | B1 | 11/2003 | Kennedy et al. |
| 6,697,844 | B1 | 2/2004 | Chan et al. |
| 6,701,428 | B1 | 3/2004 | Harvey, III et al. |
| 6,725,333 | B1 | 4/2004 | Degenaro |
| 6,754,621 | B1 | 6/2004 | Cunningham et al. |
| 6,760,813 | B1 | 7/2004 | Wu |
| 6,772,203 | B1 | 8/2004 | Feiertag et al. |
| 6,785,769 | B1 | 8/2004 | Jacobs et al. |
| 6,850,941 | B1 | 2/2005 | White et al. |
| 6,879,528 | B2 * | 4/2005 | Takeuchi et al. ............ 365/200 |
| 7,013,289 | B2 | 3/2006 | Horn |
| 7,024,452 | B1 | 4/2006 | O'Connell et al. |
| 7,096,418 | B1 | 8/2006 | Singhal |
| 7,137,009 | B1 | 11/2006 | Gordon et al. |
| 7,146,415 | B1 | 12/2006 | Doi |
| 7,188,216 | B1 | 3/2007 | Rajkumar et al. |
| 7,251,681 | B1 | 7/2007 | Gourlay |
| 7,284,100 | B2 * | 10/2007 | Slegel et al. ............ 711/156 |
| 7,325,045 | B1 | 1/2008 | Manber et al. |
| 7,343,422 | B2 | 3/2008 | Garcia-Luna-Aceves |
| 7,360,025 | B1 | 4/2008 | O'Connell et al. |
| 7,398,304 | B2 | 7/2008 | Smith et al. |
| 7,596,564 | B1 | 9/2009 | O'Connell et al. |
| 7,752,394 | B1 | 7/2010 | Rajkumar et al. |
| 7,818,506 | B1 | 10/2010 | Shepstone |
| 7,899,991 | B2 | 3/2011 | Rajkumar |
| 8,041,893 | B1 | 10/2011 | Fung |
| 8,312,222 | B1 | 11/2012 | Martin et al. |
| 8,380,932 | B1 | 2/2013 | Martin et al. |
| 8,429,169 | B2 | 4/2013 | Koopmans et al. |
| 8,438,336 | B2 | 5/2013 | Fung et al. |
| 8,452,925 | B2 | 5/2013 | Shepstone et al. |
| 8,463,998 | B1 | 6/2013 | Scheevel |
| 8,832,387 | B2 | 9/2014 | Martin et al. |
| 8,850,138 | B2 | 9/2014 | Scheevel |
| 2001/0032254 | A1 | 10/2001 | Hawkins |
| 2001/0034771 | A1 | 10/2001 | Hutsch et al. |
| 2001/0037407 | A1 | 11/2001 | Dragulev et al. |
| 2002/0065912 | A1 | 5/2002 | Catchpole et al. |
| 2002/0165877 | A1 | 11/2002 | Malcolm et al. |
| 2002/0178187 | A1 | 11/2002 | Rasmussen et al. |
| 2002/0194219 | A1 | 12/2002 | Bradley et al. |
| 2003/0078964 | A1 | 4/2003 | Parrella et al. |
| 2003/0217117 | A1 | 11/2003 | Dan et al. |
| 2004/0030697 | A1 | 2/2004 | Cochran et al. |
| 2004/0030746 | A1 | 2/2004 | Kavacheri et al. |
| 2004/0107319 | A1 | 6/2004 | D'Orto et al. |
| 2004/0205165 | A1 | 10/2004 | Melamed et al. |
| 2004/0205452 | A1 | 10/2004 | Fitzsimmons et al. |
| 2006/0136472 | A1 | 6/2006 | Jujjuri et al. |
| 2006/0184572 | A1 | 8/2006 | Meek |
| 2006/0271671 | A1 | 11/2006 | Hansen |
| 2010/0262785 | A1 | 10/2010 | Rajkumar |
| 2010/0306314 | A1 | 12/2010 | O'Connell et al. |
| 2011/0035553 | A1 | 2/2011 | Shepstone |
| 2012/0011324 | A1 | 1/2012 | Fung et al. |
| 2013/0013725 | A1 | 1/2013 | Scheevel |
| 2013/0024622 | A1 | 1/2013 | Martin et al. |
| 2014/0379842 | A1 | 12/2014 | Scheevel |

OTHER PUBLICATIONS

Fielding et al. "Caching in HTTP" part of "Hypertext Transfer Protocol—HTTP/1.1," The Internet Society, 20 pages, Ch. 13, 1999.

Dias et al., "A Smart Internet Caching System" by University of Moratuwa, Sri Lanka, 13 pages, 1996.

Office Action issued for U.S. Appl. No. 10/733,798, mailed on May 31, 2006, 14 pages.

Office Action issued for U.S. Appl. No. 10/733,798, mailed on Jan. 3, 2006, 9 pages.

Office Action issued for U.S. Appl. No. 10/733,742, mailed on Aug. 22, 2007, 14 pages.

Office Action issued for U.S. Appl. No. 10/733,742, mailed on Feb. 7, 2007, 12 pages.

Office Action issued for U.S. Appl. No. 10/733,742, mailed on Sep. 15, 2006, 8 pages.

Office Action issued for U.S. Appl. No. 10/733,742, mailed on Jun. 6, 2006, 15 pages.

Office Action issued for U.S. Appl. No. 10/733,742, mailed on Jan. 17, 2006, 10 pages.

Office Action issued for U.S. Appl. No. 11/701,193, mailed on Oct. 2, 2008, 9 pages.

Office Action issued for U.S. Appl. No. 11/701,193, mailed on Mar. 31, 2009, 9 pages.

Office Action issued for U.S. Appl. No. 11/825,909, mailed Sep. 29, 2009, 9 pages.

Office Action issued for U.S. Appl. No. 11/701,193, mailed Oct. 22, 2009, 10 pages.

Office Action issued for U.S. Appl. No. 11/825,909, mailed Mar. 5, 2010, 11 pages.

Office Action issued for U.S. Appl. No. 12/819,985, mailed on Aug. 2, 2010, 9 pages.

Notice of Allowance issued for U.S. Appl. No. 12/819,985, mailed Dec. 15, 2010, 9 pages.

Office Action issued for U.S. Appl. No. 12/904,937, mailed Jan. 5, 2011, 8 pages.

Office Action issued for U.S. Appl. No. 12/212,414, mailed May 10, 2011, 10 pages.

Office Action issued for U.S. Appl. No. 12/208,934, mailed May 10, 2011, 11 pages.

Office Action issued for U.S. Appl. No. 12/904,937, mailed May 25, 2011, 9 pages.

Notice of Allowance issued for U.S. Appl. No. 12/206,909, mailed Jul. 12, 2011, 10 pages.

Office Action issued for U.S. Appl. No. 12/904,937, mailed Sep. 2, 2011, 11 pages.

Office Action issued for U.S. Appl. No. 12/208,072, mailed Sep. 23, 2011, 10 pages.

Office Action issued for U.S. Appl. No. 12/208,934, mailed Oct. 17, 2011, 11 pages.

Office Action issued for U.S. Appl. No. 12/212,414, mailed Oct. 17, 2011, 11 pages.

Office Action issued for U.S. Appl. No. 12/904,937, mailed Dec. 1, 2011, 10 pages.

Notice of Allowance issued for U.S. Appl. No. 13/237,236, mailed Mar. 9, 2012, 4 pages.

(56) References Cited

OTHER PUBLICATIONS

Notice of Allowance issued for U.S. Appl. No. 12/208,072, mailed Feb. 27, 2012, 2 pages.
Office Action issued for U.S. Appl. No. 12/208,934, mailed Mar. 27, 2012, 11 pages.
Office Action issued for U.S. Appl. No. 12/212,414, mailed Mar. 28, 2012, 10 pages.
Notice of Allowance issued for U.S. Appl. No. 12/904,937, mailed Apr. 24, 2012, 3 pages.
Office Action issued for U.S. Appl. No. 12/212,414, mailed Sep. 17, 2012, 6 pages.
Notice of Allowance issued for U.S. Appl. No. 13/237,236, mailed Dec. 6, 2012, 4 pages.
Notice of Allowance issued for U.S. Appl. No. 12/208,072, mailed Dec. 26, 2012, 2 pages.
Notice of Allowance issued for U.S. Appl. No. 12/904,937, mailed Jan. 22, 2013, 3 pages.
Notice of Allowance issued for U.S. Appl. No. 13/237,236, mailed Mar. 18, 2013, 4 pages.
Notice of Allowance issued for U.S. Appl. No. 12/208,072, mailed Apr. 16, 2013, 2 pages.
Office Action issued for U.S. Appl. No. 13/620,396, mailed Dec. 3, 2013, 9 pages.
Office Action issued for U.S. Appl. No. 13/619,861, mailed Dec. 3, 2013, 9 pages.
Notice of Allowance issued for U.S. Appl. No. 13/619,861, mailed Apr. 28, 2014, 8 pages.
Notice of Allowance issued for U.S. Appl. No. 13/620,396, mailed on May 8, 2014, 7 pages.
Notice of Allowance issued for U.S. Appl. No. 13/619,861, mailed May 23, 2014, 4 pages.
Notice of Allowance issued for U.S. Appl. No. 14/477,728, mailed Mar. 2, 2015, 7 pages.
Office Action issued for U.S. Appl. No. 14/477,728, mailed Nov. 25, 2014, 6 pages.

\* cited by examiner

| | ORIGINAL URL | CACHE DIRECTORY | PAGE I.D. | TTL | RE-GEN |
|---|---|---|---|---|---|
| 162 | http://www.vignette.com/ | QWERTY/UIOPPASR/ | ASDFGH | 5:00 | N |
| 164 | http://www.vignette.com/us/Solutions/Vignette+Web+Experience+Platform | QWERTY/UIOPPASR/ | YUIRTY | 7:45 | N |
| 166 | http://www.vignette.com/us/Events+%26+Webcasts | RXCVBN/NMJKLFGH/ | WDBHYK | 0:39 | N |
| 168 | http://www.vignette.com/us/Products/Web+Content+Management | STYUSF/UHRFVYIM/ | ERFTHY | 0:00 | Y |
| 170 | http://www.vignette.com/us/Services/Support1 | SZHJUY/DFGYHJJI/ | HJJKKY | 3:23 | Y |
| 172 | http://www.vignette.com/us/Services/Support2 | VJLKJL/RADHYIKV/ | XCFSRD | 6:21 | N |
| 174 | http://www.vignette.com/us/Customers/Customer+List | ZUIOOA/SFTDHSJS/ | MGVFTD | 8:12 | N |

*FIG. 6*

| PAGE IDENTIFIER | Object1 | Object2 | Object3 | ... | Objectn-1 | Objectn |
|---|---|---|---|---|---|---|
| QWERTYUIOPPASRASDFGH | object 401 | | | ... | | |
| QWERTYUIOPPASRASDFGH | object 402 | | | ... | | |
| QWERTYUIOPPASRYUIRTY | object 401 | | | ... | | |
| QWERTYUIOPPASRYUIRTY | object 404 | | | ... | | |
| QWERTYUIOPPASRYUIRTY | object 410 | | | ... | | |
| RXCVBNNMJKLFGHWDBHYK | object 401 | | | ... | | |
| RXCVBNNMJKLFGHWDBHYK | object 403 | | | ... | | |
| RXCVBNNMJKLFGHWDBHYK | object 405 | | | ... | | |
| RXCVBNNMJKLFGHWDBHYK | object 407 | | | ... | | |
| STYUSFUHRFVYIMERFTHY | object 401 | | | ... | | |
| STYUSFUHRFVYIMERFTHY | object 406 | | | ... | | |
| SZHJUYDFGYHJJIHJJKKY | object 401 | | | ... | | |
| SZHJUYDFGYHJJIHJJKKY | object 408 | | | ... | | |
| VJLKJLRADHYIKVXCFSRD | object 401 | | | ... | | |
| VJLKJLRADHYIKVXCFSRD | object 409 | | | ... | | |
| ZUIOOASFTDHSJSMGVFTD | object 401 | | | ... | | |
| ZUIOOASFTDHSJSMGVFTD | object 402 | | | ... | | |
| set 411 | object 402 | object 410 | | | | |
| set 412 | object 402 | object 403 | object 405 | ... | object 406 | object 407 |
| QWERTYUIOPPASRASDFGH | set 411 | | | | | |
| QWERTYUIOPPASRYUIRTY | set 412 | | | | | |
| set 413 | set 411 | set 412 | object 408 | | | |

*FIG. 7*

EVENT-DRIVEN INVALIDATION OF PAGES FOR WEB-BASED APPLICATIONS

CROSS REFERENCE TO RELATED APPLICATIONS

This application is a continuation of and claims a benefit of priority under 35 U.S.C. §120 from U.S. patent application Ser. No. 13/620,396, filed Sep. 14, 2012, now U.S. Pat. No. 8,832,387, entitled "EVENT-DRIVEN REGENERATION OF PAGES FOR WEB-BASED APPLICATIONS," which is a continuation of U.S. patent application Ser. No. 12/208,934, filed Sep. 11, 2008, now U.S. Pat. No. 8,312,222, entitled "EVENT-DRIVEN REGENERATION OF PAGES FOR WEB-BASED APPLICATIONS," which is a continuation-in-part application of U.S. patent application Ser. No. 11/825,909, filed Jul. 10, 2007, now U.S. Pat. No. 7,818,506, entitled "METHOD AND SYSTEM FOR CACHE MANAGEMENT," which is a continuation-in-part application of U.S. patent application Ser. No. 10/733,742, filed Dec. 11, 2003, now U.S. Pat. No. 7,360,025, entitled "METHOD AND SYSTEM FOR AUTOMATIC CACHE MANAGEMENT," which claims priority from Provisional Application No. 60/433,408, filed Dec. 13, 2002, entitled "EXTENSIBLE FRAMEWORK FOR CACHING AND CONFIGURABLE CACHING PARAMETERS." This application relates to U.S. patent application Ser. No. 10/733,798, filed Dec. 11, 2003, now U.S. Pat. No. 7,188,216, entitled "METHOD AND SYSTEM FOR AN EXTENSIBLE CACHING FRAMEWORK," No. 11/444,023, filed May 31, 2006, entitled "SYSTEM AND METHOD FOR THE DYNAMIC PROVISIONING OF STATIC CONTENT," and No. 11/444,020, filed May 31, 2006, now U.S. Pat. No. 7,860,820, entitled "A SYSTEM USING CONTENT GENERATOR FOR DYNAMICALLY REGENERATING ONE OR MORE FRAGMENTS OF WEB PAGE BASED ON NOTIFICATION OF CONTENT CHANGE." All applications cited within this paragraph are fully incorporated herein by reference.

TECHNICAL FIELD

Embodiments of the disclosure relate generally to managing page caches and more particularly to systems and methods of invalidating and regenerating cached pages based on invalidation events.

BACKGROUND

With the proliferation of information on the Internet, it is becoming increasingly difficult to prepare and deliver content to end users in an efficient and timely manner. Current content delivery systems employ various content publishing techniques. Typically, most web sites are produced by in-sequence publishing actions. For example, a set of web pages can be generated by an application server and made available to a web server for appropriate actions. In other words, to implement a web site, a set of web pages may be produced at an application layer and published at a presentation layer.

In response to an end user request, the web server may serve one or more web pages to the end user. As repeatedly serving frequently requested web pages can consume resources, dynamically generated web pages can be cached to quickly service user requests and conserve processing and network resources. Thus, when an end user elects to "refresh" previously delivered content (e.g., by clicking a "Refresh" button on a browser application's menu), the same content may be retrieved from a cache and again delivered to that end user.

All of the web pages implementing a web site can be updated as needed or reproduced at some regular interval to incorporate changes in the content. However, in conventional content delivery systems, all of the web pages implementing the web site may have to be reproduced. Moreover, changes made to the content may only be taken into account at the intervals at which the web pages are reproduced. Thus, web pages delivered to an end user may, for a period of time, contain stale content. In addition, reproducing web pages for each and every web site affected by certain changes may require a long period of time.

Another content publishing technique involves portal applications or standard Java® service or Server Page (JSP) applications. These applications typically have dynamic scripting capability that can work in tandem with hypertext markup language (HTML) code to separate the logic of a page from its static elements (e.g., the actual design layout and display of the page). The extracted portion of the page can then be used to make dynamic database queries and assemble pages on-the-fly accordingly. However, the logic and the content underlying the pages assembled on-the-fly can be modified after the pages are delivered, thereby allowing stale content to remain in circulation.

SUMMARY OF THE DISCLOSURE

Embodiments of the present disclosure provide systems and methods for regenerating cached pages that eliminate, or at least substantially reduce, the shortcomings of previously available systems and methods for regenerating cached pages.

Systems and methods for invalidating and regenerating pages are provided by various embodiments. In one embodiment, a method can include detecting content changes in a content database including various objects. The method can include causing an invalidation generator to generate an invalidation event based on the modification to one or more content objects and communicating the invalidation event to a dependency manager. A cache manager can be notified that one or more pages in a cache might be invalidated based on the invalidation event.

In one embodiment, a method can include receiving a page invalidation notice and sending a page regeneration request to a page generator. The method can include regenerating the cached page. The method can include forwarding the regenerated page to the cache manager and replacing the cached page with the regenerated page.

In one embodiment, a method can include invalidating a cached page based on a content modification and regenerating pages which might depend on the modified content. In some embodiments, the method can include determining whether a cached page which can be dependent on various objects and can be stored in the page cache is affected by the modification of one or more objects stored in the content database. The dependencies between the cached page and the objects can be stored in a dependency database accessible by the dependency manager. In some embodiments, the dependencies can be discovered during regeneration of the cached page. The dependencies can include a reference to the cached page and a reference to an object in some embodiments.

One embodiment disclosed herein may provide a computer readable storage medium storing instructions for implementing methods of invalidating and regenerating cached pages as described above. One embodiment of a system for regenerating a cached page may comprise a processor and a computer readable storage medium accessible by the processor and storing instructions executable by the processor to perform methods of invalidating and regenerating cached pages as described above.

Embodiments disclosed herein can provide many advantages. For example, regenerating cached pages can reduce the amount of stale data in the cache. When stale data happens to be in the cache, embodiments disclosed herein can reduce the time during which such stale data resides in the cache. Furthermore, overlapping invalidation events may allow invalidated pages to remain in the cache. Embodiments disclosed herein can detect overlapping modifications and can avoid caching pages which may have become stale while being regenerated. In embodiments disclosed herein, pages can be invalidated based on events. In some embodiments, invalidated pages can be regenerated. In some embodiments, invalidated pages can be discarded. By reducing the amount of stale data in the cache, embodiments disclosed herein can facilitate the fast and efficient delivery of correct and timely content.

These, and other, aspects will be better appreciated and understood when considered in conjunction with the following description and the accompanying drawings. The following description, while indicating various embodiments and numerous specific details thereof, is given by way of illustration and not of limitation. Many substitutions, modifications, additions, or rearrangements may be made within the scope of the disclosure, and the disclosure includes all such substitutions, modifications, additions, or rearrangements.

BRIEF DESCRIPTION OF THE DRAWINGS

A more complete understanding of the disclosure and the advantages thereof may be acquired by referring to the following disclosure, taken in conjunction with the accompanying drawings in which like reference numbers generally indicate like features.

FIG. 6 illustrates one embodiment of a cache control table.

FIG. 7 illustrates one embodiment of page dependencies.

DETAILED DESCRIPTION

Figure 1:
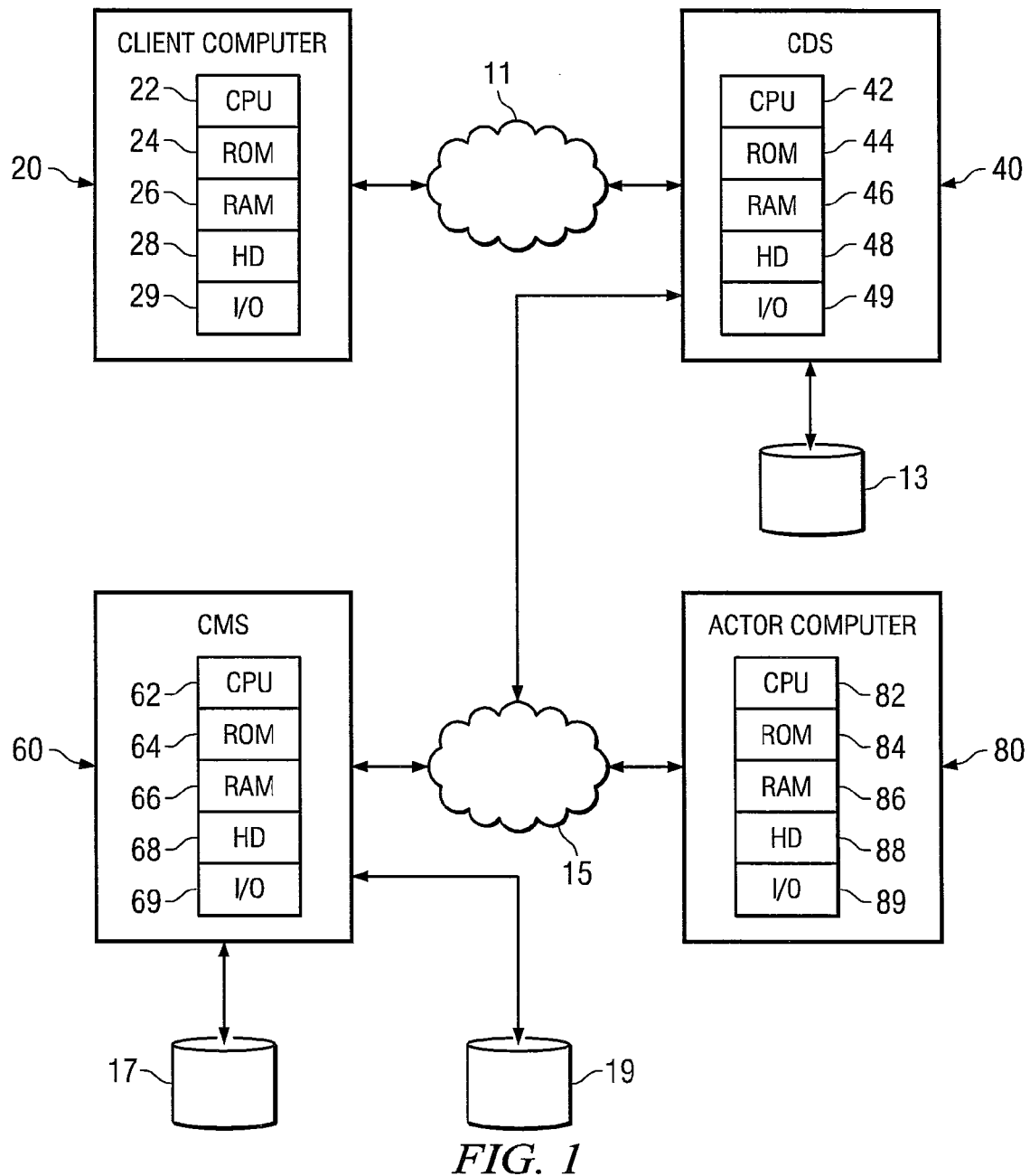
FIG. 1 is a diagrammatic representation of a hardware configuration of a network environment implementing embodiments disclosed herein.

Various embodiments of the disclosure are illustrated in the FIGURES, like numerals being generally used to refer to like and corresponding parts of the various drawings. Embodiments of the disclosure provide systems and methods for regenerating cached pages.

Before discussing specific embodiments, an embodiment of a hardware architecture for implementing certain embodiments is described herein. One embodiment can include a computer communicatively coupled to a network (the Internet in some embodiments). As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylus, etc.), or the like. In various embodiments, the computer has access to at least one database over the network.

ROM, RAM, and HD are non-transitory computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

The functionalities and processes described herein can be implemented in suitable computer-executable instructions. The computer-executable instructions may be stored as software code components or modules on one or more computer readable storage media (such as non-volatile memories, volatile memories, DASD arrays, magnetic tapes, floppy diskettes, hard drives, optical storage devices, etc. or any other appropriate computer-readable storage medium or data storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

A few terms are defined or clarified to aid in understanding the descriptions that follow. A network includes an interconnected set of server and client computers over a publicly available medium (e.g., the Internet) or over an internal (company-owned) system. A user at a client computer may gain access to the network using a network access provider. An Internet Service Provider ("ISP") is a common type of network access provider.

Within this disclosure, term "portal" generally refers to a gateway that is or can be a starting site, a home site, or an anchor site for networked end users visiting the World Wide Web (WWW or web). Examples of portals include www.yahoo.com, www.cnet.com, www.microsoft.com, and www.aol.com. A portal is a kind of web site with a rich navigation structure of internal links within the same site and external links to other sites. In some cases, a company may provide one or more portals connecting the company's intranet to the web. Currently, most portals adopt a style of categorizing content with a text-intensive, fast loading web page. Services provided by portals or portal sites typically include a directory of web sites or links, a search facility to search for other sites, news, weather, email, stock quotes, maps, and so on.

A portal site may comprise portlets or portal pages through which a plurality of channels and sub-channels of content can be presented to end users. Large scale portal sites capable of handling a high volume of content are typically built with a few "page templates" that can be reused to display content. For example, in response to an end user request, a portal page may be assembled on-the-fly based on a page template. In this manner, content displayed on the portal site can remain relatively up-to-date and not all pages of the portal site must be reproduced to limit the overall amount of stale content in the portal site.

Web sites and portal sites, particularly large scale portal sites, are generally produced and managed at the server side, transparent to end users. While content delivery systems employing JSP or portal applications offer many advantages, there is no automated process to coordinate update activities in the backend. For example, update activities made by, and at, a content management system may not be automatically propagated to a content delivery system. This may result in stale content remaining in caches in the content delivery system. Therefore, there is a need for new systems and methods for regenerating cached pages.

Within this discussion, the term "complex record" refers to a single logical entity that may comprise more than one row in more than one table within a database. The term "software component" refers to at least a portion of a computer program (i.e., a software application). Examples include a content delivery software component, a content management software component, or the like. Different software components may reside in the same computer program or in different computer programs on the same computer or different computers.

Before discussing embodiments, an exemplary hardware architecture for using the embodiments is described. FIG. 1 illustrates an exemplary architecture and includes external network 11 that can be bi-directionally coupled to client computer 20 and content delivery system ("CDS") 40. CDS 40 can be bi-directionally coupled to database 13. An internal network 15 can be bi-directionally coupled to CDS 40, content management system ("CMS") 60, and actor computer 80. CMS 60 can be bi-directionally coupled to databases 17 and 19, each of which may contain data objects and metadata regarding those objects in tables within those databases. CDS 40, CMS 60, and databases 13, 17, and 19 may be part of a network site. Note that FIG. 1 is a simplification of a hardware configuration.

Within each of CDS 40 and CMS 60, a plurality of computers (not shown) may be interconnected to each other over internal network 15 or a combination of internal and external networks. For simplification, a single system is shown for each of CDS 40 and CMS 60. Other systems (e.g., page generator, application server, etc.) may be part of CDS 40, CMS 60, or additional systems that are bi-directionally coupled to the internal network 15.

A plurality of other client computers 20 may be bi-directionally coupled to external network 11, and a plurality of actor computers 80 may be coupled to internal network 15. Actor computers 80 may include personal computers or workstations for individuals that use internal network 15. These individuals may include content developers, editors, content reviewers, webmasters, information technology specialists, and the like. Many other alternative configurations are possible and known to skilled artisans.

Client computer 20 can include central processing unit ("CPU") 22, read-only memory ("ROM") 24, random access memory ("RAM") 26, hard drive ("HD") or storage memory 28, and input/output device(s) ("I/O") 29. I/O 29 can include a keyboard, monitor, printer, electronic pointing device (e.g., mouse, trackball, etc.), or the like. Client computer 20 can include a desktop computer, a laptop computer, a personal digital assistant, a cellular phone, or nearly other device capable of communicating over a network. Actor computer 80 may be similar to client computer 20 and can comprise CPU 82, ROM 84, RAM 86, HD 88, and I/O 89.

CDS 40 can include a server computer comprising CPU 42, ROM 44, RAM 46, HD 48, and I/O 49, and CMS 60 can include a server computer comprising CPU 62, ROM 64, RAM 66, HD 68, and I/O 69. CDS 40 or CMS 60 may have one or more of a content delivery software component, a page generator software component, the content management software component, an applications software component, and the like.

Each of the computers in FIG. 1 may have more than one CPU, ROM, RAM, HD, I/O, or other hardware components. For simplicity, each computer is illustrated as having one of each of the hardware components, even if more than one is used. The content and its metadata, if any, may be located within any or all of CDS 40, CMS 60, and databases 13, 17, and 19. During staging, a user at actor computer 80 may have access to proxy objects for the content. After staging, data objects may be copied into database 13 via CDS 40, so that the data object may be accessed quicker by CDS 40 to respond to requests from client computer 20. Another advantage is that this separation of content items and proxies allows CDS 40 to deliver one version of a content item (or collection of content items) while the "original" undergoes modification in CMS 60.

Each of computers 20, 40, 60, and 80 is an example of a data processing system. ROM 24, 44, 64, and 84; RAM 26, 46, 66, and 86; HD 28, 48, 68, and 88; and databases 13, 17, and 19 can include media that can be read by CPU 22, 42, 62, or 82. Therefore, each of these types of memories includes a data processing system readable medium. These memories may be internal or external to computers 20, 40, 60, or 80.

Figure 2:
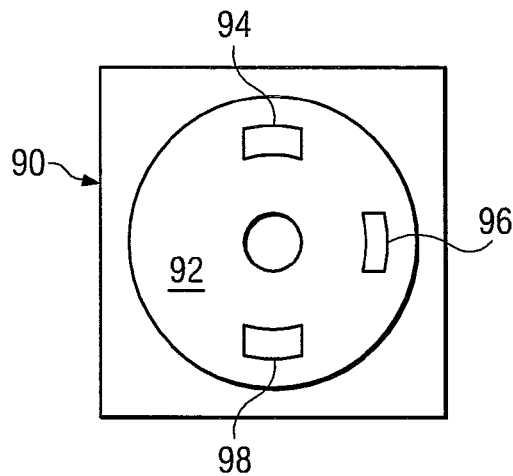
FIG. 2 is a diagrammatic representation of a computer readable storage medium storing computer executable instructions implementing a method of invalidating cached pages and regenerating pages based on invalidation events according to one embodiment disclosed herein.

Portions of the methods described herein may be implemented in suitable software code that may reside within ROM 24, 44, 64, or 84, RAM 26, 46, 66, or 86, or HD 28, 48, 68, or 88. In addition to those types of memories, the instructions in an embodiment may be contained on a data storage device with a different data processing system readable storage medium, such as a hard disk. FIG. 2 illustrates a combination of software code elements 94, 96, and 98 that are embodied within a data processing system readable medium 92, on HD 90. Alternatively, the instructions may be stored as software code elements on a DASD array, magnetic tape, floppy diskette, optical storage device, or other appropriate data processing system readable medium or storage device.

Figure 3:
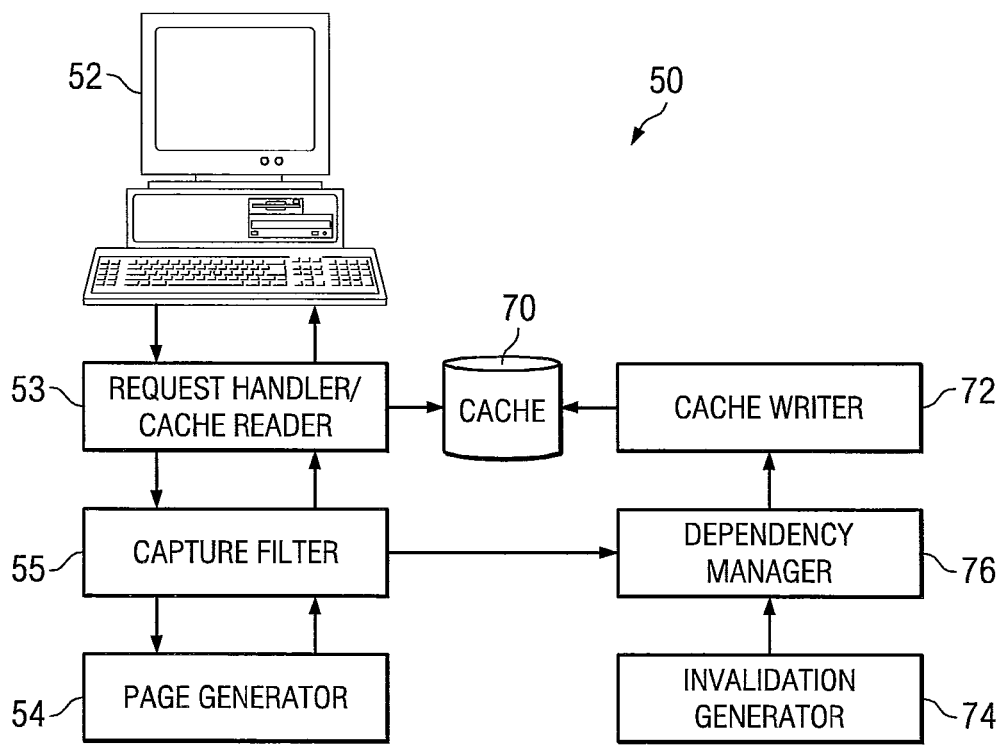
FIG. 3 illustrates one embodiment of system architecture for invalidating cached pages and regenerating pages based on invalidation events.

With reference now to FIG. 3, one embodiment of architecture 50 is illustrated. Architecture 50 can allow end users to access content via user device 52. Architecture 50 can include request handler/cache reader 53, page generator 54, capture filter 55, page cache 70, cache writer 72, invalidation generator 74, and dependency manager 76. These devices 52-55, 70, 72, 74, and 76 can be networked together by various local area networks (LANs) and wide area networks (WANs) and can communicate with user device 52 via various telecommunication systems such as the Internet.

When a request for content is received from user device 52, request handler/cache reader 53 can determine whether page cache 70 contains the requested content. When page cache 70 contains the requested content, request handler/cache reader 53 can serve that content to user telecommunications device 52. When page cache 70 does not contain the requested content, request handler/cache reader 53 can forward the request to capture filter 55. Capture filter 55 can set up cache control information associated with the requested content and pass such information and control to page generator 54. Page generator 54 can generate the requested content (in conjunction with some content source(s) in some embodiments) and return the requested content to capture filter 55. Page generator 54 can annotate the cache control information with additional information regarding the requested content and return the annotated cache control information with the requested content. Capture filter 55 can forward the requested content and annotated cache control information to request handler/cache reader 53. Request handler/cache reader 53 can then serve the requested content to user device 52.

In the meantime, capture filter 55 can parse the annotated cache control information for information pertaining to the dependency of certain objects within the requested content on other objects within the requested content (or associated therewith). Capture filter 55 can forward the requested content and associated dependency and cache control information to dependency manager 76. Dependency manager 76 can forward the requested content to cache writer 72 for storage in page cache 70. Dependency manager 76 can store the dependency information and cache control information for subsequent use. Invalidation generator 74 will notify dependency manager 76 that one or more objects on which pages in page cache 70 depend have been modified. Dependency manager 76 then uses the dependency information that it stored earlier to identify pages in page cache 70 that should be invalidated.

Figure 4:
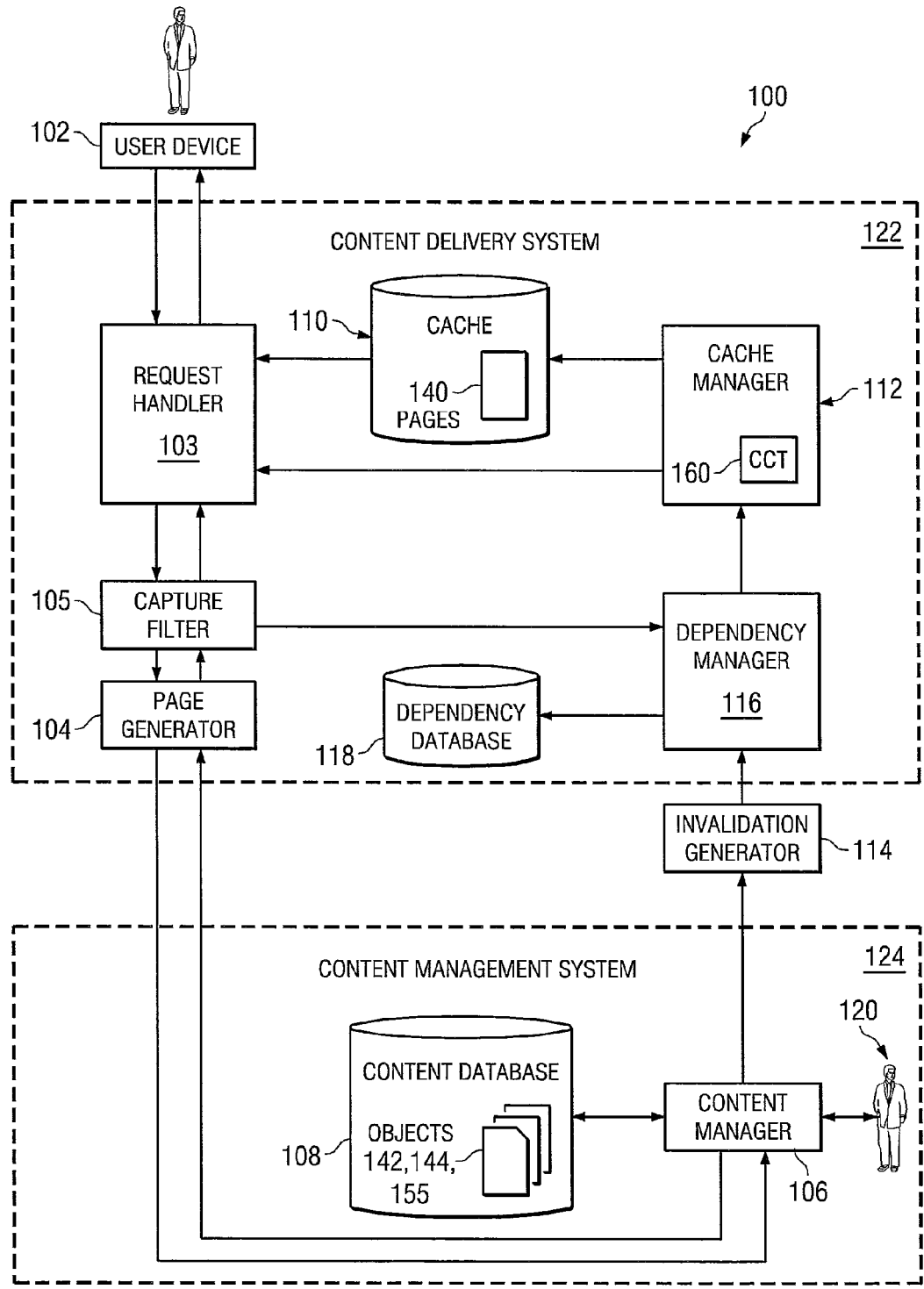
FIG. 4 illustrates one embodiment of a content delivery system comprising a plurality of components for invalidating cached pages and regenerating pages based on invalidation events.

With reference now to FIG. 4, one embodiment of system 100 is illustrated. End users can access system 100 via user device 102 to request that pages (or other data structures) conveying content be delivered to them. User device 102 can communicate with request handler 103 via the Internet or other telecommunications systems, networks, etc. System 100 can include request handler 103, capture filter 105, content manager 106, page generator 104, content database 108, page cache 110, cache manager 112, dependency manager 116, and dependency database 118. In some embodiments, request handler 103, content manager 106, content database 108, page cache 110, cache manager 112, invalidation generator 114, dependency manager 116, and dependency database 118 can be networked together via various local area networks (LANs) and wide area networks (WANs).

In some embodiments, system 100 can serve pages to portals operating on the Internet or an enterprise network. In some embodiments, system 100 can include a separate content management system 124, a separate content delivery system 122, and a separate invalidation generator 114 in communication with content management system 124 and content delivery system 122. In some embodiments, content management system 124 can include content manager 106, and content database 108. In some embodiments, content delivery system 122 can include request handler 103, page generator 104, capture filter 105, page cache 110, cache manager 112, dependency manager 116, and dependency database 118.

Figure 5:
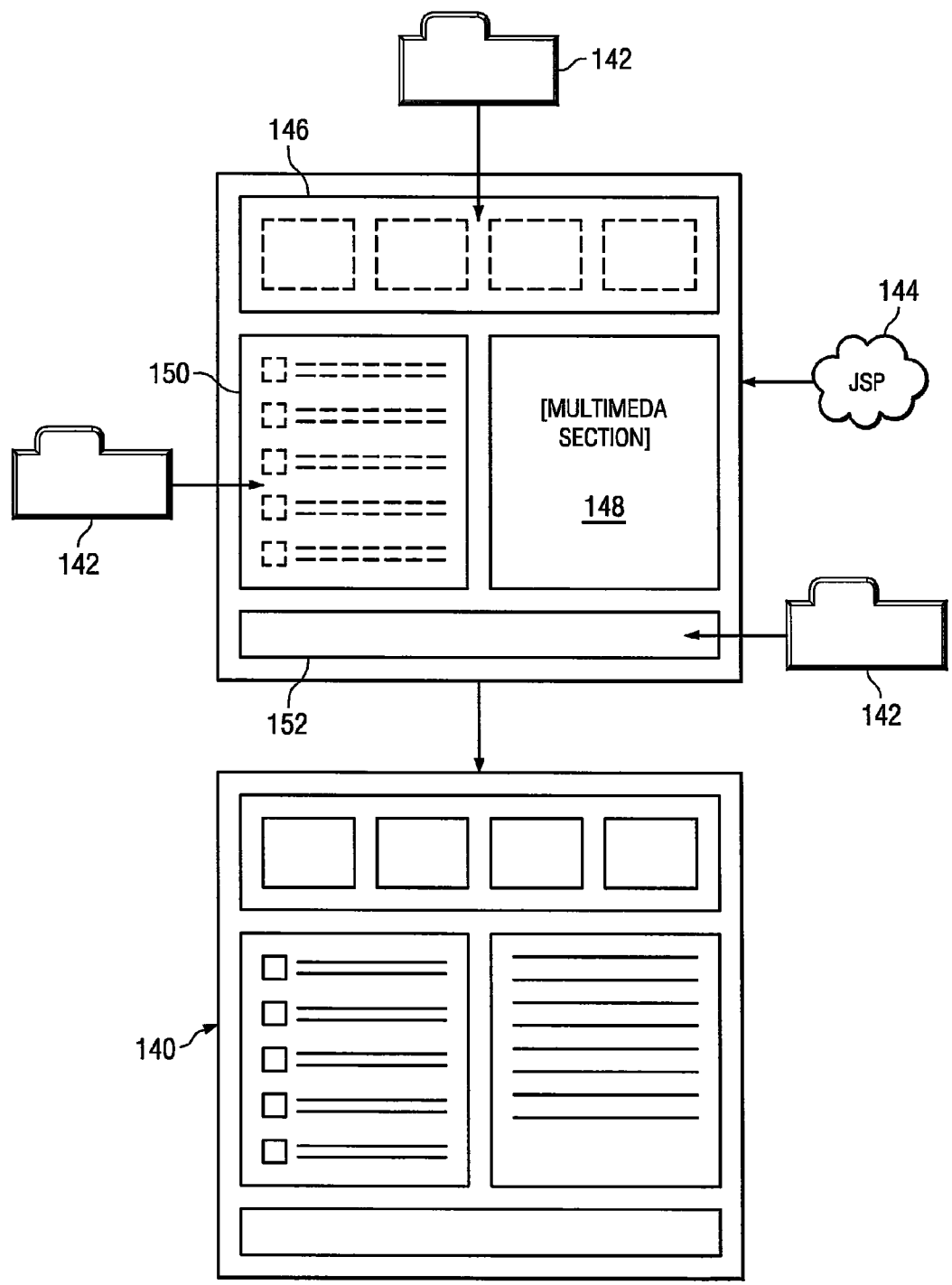
FIG. 5 illustrates one embodiment of a page.

FIG. 5 illustrates one embodiment of page 140. Content delivery system 122 can generate and deliver pages 140 via user device 102. Pages 140 can include various content objects 142 and code objects 144. Content objects 142 can include text, audio, still image, video, multi-media, etc. objects for presentation via page 140. Code objects 144 can include various JSPs (Java Server Pages) servlets, active server pages (ASPs), scripts such as VB Scripts or JScripts, ADOs (ActiveX Data Objects), etc. which control the appearance of page 140 or otherwise operate on content objects 142. Thus, page 140 can be assembled from content objects 142 using code objects 144. More particularly, various sections 146, 148, 150, and 152 can be used to present content conveyed by content objects 142 as controlled by code objects 144. Page 140 can therefore be dependent on content objects 142 and code objects 144 for content, appearance, functionality, or combinations thereof. U.S. patent application Ser. No. 10/358,746, file May 20, 2003, and entitled "CENTRALIZED CONTROL OF CONTENT MANAGEMENT TO PROVIDE GRANULAR ENTERPRISE-WIDE CONTENT MANAGEMENT," describes systems and methods for generating pages 140 and is incorporated herein as if set forth in full.

In some embodiments, pages 140 can be static pages containing dynamically provisioned content. U.S. patent application Ser. No. 11/444,023, filed May 31, 2006, and entitled "SYSTEM AND METHOD FOR THE DYNAMIC PROVISIONING OF STATIC CONTENT," discloses systems and methods for the dynamic provisioning of static content and is incorporated herein as if set forth in full. In some embodiments, pages 140 can be dynamic pages containing dynamically generated content. U.S. patent application Ser. No. 11/444,020, filed May 31, 2006, and entitled "SYSTEM AND METHOD FOR THE PROVISIONING OF DYNAMICALLY GENERATED CONTENT," discloses systems and methods for the provisioning of dynamically generated content and is incorporated herein as if set forth in full.

With reference again to FIG. 4, page cache 110 can include various pages 140 which may have, at some time or other, been requested by end users or placed in page cache 110 by system administrators or other actors associated with content delivery system 122. In some situations, page cache 110 may contain millions of pages 140 or more. Cache manager 112 can read from, write to, and perform other functions with respect to page cache 110. More particularly, cache manager 112 can write pages 140 to page cache 110, read pages 140 from page cache 110, and discard certain pages 140 from page cache 110.

When performing certain functions associated with page cache 110, cache manager 112 can utilize a cache control table or some other data structure providing similar functionality to cache manager 112. With reference now to FIG. 6, one embodiment of cache control table 160 is illustrated. Cache control table 160 can include entries 161 for various pages 140. Each particular entry 162, 164, 166, 168, 170, 172, and 174 can correspond to a particular page 140 in page cache 110. In some embodiments, cache manager 112 distributes entries 162, 164, 166, 168, 170, 172, and 174 with the corresponding pages 140 in page cache 110 instead of utilizing cache control table 160. For each page 140, though, cache control table 160 can include cache directory 178, page identifier 180, Time to Live (TTL) 182, and regeneration information 186. Uniform Resource Locators (URLs) 176 can indicate the network locations of pages 140 and are shown in cache control table 160 for reference. In some embodiment, URLs 176 are not stored in cache control table 160. In various embodiments, other methods of identifying pages 140 could be used to associate entries 178, 180, 182, 184, and 186 of cache control table 160 with particular pages 140. For instance, as will be described below, cache manager 112 can use hashes of URLs 176 to locate pages 140 in page cache 110. In some embodiments, cache manager 112 can use cache directory 178 and page identifier 180 (instead of URLs 176) to locate pages 140 in page cache 110.

In some embodiments, cache directory 178 and page identifier 180 for a particular entry 161 can be derived using a one-way hash of the URL 176 of that page 140. More particularly, a hash function can be chosen so that, for any two URLs, the resulting hashes will most certainly differ even when the particular pages 140 have relatively small differences between them. For instance, a comparison of entries 170 and 172 illustrates that even a very small change (for instance, the difference between "Support1" and "Support2" in URLs) can result in widely different hash values. Thus, the hash function can produce a unique hash for each URL 176. One suitable hash function is Message-Digest algorithm 5 (MD5) which produces a 128-bit hash value. Other cryptographic hash functions and digital finger printing methods may also be suitable for implementations. For exemplary teachings on managing caches using hashed URLs, readers are directed to U.S. patent application Ser. No. 12/206,909, filed Sep. 9, 2008, and entitled "SYSTEM AND METHOD FOR MANAGING LARGE FILE SYSTEM-BASED CACHES," which is incorporated herein by reference.

In some embodiments, each page identifier 180 can be derived from the hash of URL 176 corresponding to a particular page 140. In some embodiments, each cache directory 178 can be derived from portions of a hash of URL 176 corresponding to a particular page 140 and, in some embodiments, variation information pertaining thereto. Referring to FIG. 6, for entry 162, "http://www.vignette.com/" has a 20-bit hexadecimal hash value of:

QWERTYUIOPPASRASDFGH

FIG. 6 shows that a prefix of six characters "QWERTY" and a prefix of eight characters "UIOPPASR" of the hash value are used to create a cache directory "QWERTY/UIOPPASR/" and that six characters "ASDFGH" were used for page identifier 180. Together, these particular entries 178 and 180 can form a particular overall cache path QWERTY/UIOPPASR/ASDFGH. One skilled in the art can appreciate that any number of characters of the hash value can be used and appropriate control characters such as "/" can be inserted as desired without departing from the scope of the disclosure. Moreover, other hash functions or other page identifiers may also be used without departing from the scope of the invention.

With continuing reference to FIG. 6, TTL entries 182 illustrate that, in some embodiments, page cache 110 can include "time to live" functionality to limit the likelihood that some pages 140 will become stale. In such embodiments, each page 140 can have a corresponding time limit as specified in TTL entries 182. Request handler 103 can check TTL entries 182 before obtaining page 140 from page cache 110 and discard a particular cached page if it has expired. In some embodiments, cache manager 112 can discard such expired pages 140 and cause regeneration of the same. For a given page 140, TTL entry 182 can be set when cache manager 112 writes the corresponding page 140 to page cache 110.

The above-described TTL approach has several limitations. For example, stale pages 140 may remain in page cache 110 between TTL driven regenerations. However, content, on which pages 140 depend, may be updated, deleted, or created, from time-to-time by content manager 106 (see FIG. 4). As a result, unless pages 140 are regenerated on a frequent basis, pages 140 in page cache 110 will be stale until such time as they are regenerated.

The above-described TTL approach may also cause some non-stale, valid pages 140 to be regenerated needlessly. Such needless page regenerations can occur when certain cached pages 140 are relatively stable compared to their TTL entries 182. Thus, some cached pages 140 might be regenerated too frequently under the TTL approach, wasting network and processing resources.

Regeneration entries 186 of cache control table 160 can indicate whether a page may be regenerated or not. Cache manager 112 can decide whether or not to regenerate a particular page 140. When cache manager 112 receives an invalidation event for a particular page 140, cache manager 112 can kill that page 140 if regeneration entry 186 indicates that page 140 should not be regenerated. If regeneration entry 186 indicates that that page 140 may be regenerated, cache manager 112 can compare information regarding how often that page 140 is accessed (for instance, the last access time) to determine whether that page 140 is accessed frequently enough to make regeneration desirable. If so, cache manager 112 can issue an appropriate regeneration request to page generator 104. If not, cache manager 112 can delete page 140 or remove references to page 140 from page cache 110.

FIG. 7 illustrates one embodiment of dependency table 200 of dependency database 118 in which various dependencies 201 can be listed. FIG. 7 illustrates that dependency table 200 can include an arbitrarily large number n of object identification entries 204 for each dependency 201. Each dependency 201 can be a tuple identifying a page 140 and one or more objects 142 and 144 (see FIG. 5) on which that page 140 depends. Thus, each dependency 201 may contain a reference to a single page 140 and reference(s) to one or more objects 142 and 144 on which the single page 140 depends. In embodiments disclosed herein, a page 140 may have zero or more dependencies associated therewith.

In some embodiments, hash value 202 corresponding to an URL for a particular page 140 is used to identify that particular page 140. For example, dependency 206 for a particular page 140 may contain a hash value of "QWERTYUIOPPASRASDFGH" referencing that particular page 140 and a reference to object 401, indicating that this particular page 140 depends on object 401. The same particular page 140 may also depend on object 402 according to dependency 208. Another page 140, as indicated by dependencies 210, 212, and 214, may depend on object 401, object 404, and object 410. In some embodiments, modification to a single object may invalidate a page, regardless whether that page also depends on other objects. In some embodiments, modification to a single object may invalidate more than one page. For example, suppose object 401 of FIG. 7 has been modified, all pages that depend on object 401, including those referenced by dependencies 206 and 210, would be invalidated. In some embodiments, dependencies referencing pages that have been invalidated due to the modification to object 401 would be removed from dependency table 200 of dependency database 118.

With continuing reference to FIG. 7, dependencies 216 and 218 illustrate that certain pages 140 (corresponding to hash values 202 of SZHJUYDFGYHJJIHJJKKY and VJLKJL-RADHYIKVXCFSRD) can directly depend on object 408 and object 409. Such dependencies can be deemed "direct dependencies" since if object 408 or 409 is modified, the particular pages 140 which depend thereon can become stale in page cache 110.

Dependency table 200 also illustrates one embodiment of "set dependencies" 203. Set dependencies 203 can include collections of objects 142 and 144 as reflected by various object entries 204. As illustrated by FIG. 7, set dependency 220 and set dependency 222 can include, respectively, a certain set 411 of objects (object 402 and object 410) and another certain set 412 of objects (object 402, object 403, object 405, object 406, and object 407). FIG. 7 further illustrates that certain dependencies 224 and 226 can depend on set dependencies 220 and 222 (object set 411 and object set 412) respectively. FIG. 7 illustrates that set dependencies 220 and 222 can be nested such that certain nested dependencies 228 can depend on set dependencies 220 and 222 as well as other objects (for instance, object 408). In some embodiments, a single level of nesting can be sufficient.

Still referring to FIG. 7, certain pages 140 may depend on certain objects 142 and 144 directly, or through set dependencies 203. More specifically, dependency table 200 indicates that pages 140 corresponding to dependencies 206 and 210 (among others) can depend on object 401 directly. Dependency table 200 indicates that a certain page 140 (corresponding to dependency 208) can depend on object 402 directly. Dependency table 200 indicates that pages 140 corresponding to dependencies 224 and 226 can depend on object 402 indirectly through set dependencies 220 and 222. Nested dependency 228 indicates that some set dependencies 203 can depend on object sets 411 and 412 (see set dependencies 220 and 222). FIG. 7, therefore, illustrates that set dependencies 203 can be nested.

In some embodiments, dependency manager 116 (of FIG. 4) can allow direct dependencies 201 and set dependencies 203 to accumulate in dependency table 200. Dependency manager 116 can allow dependencies 201 and 203 to reside in dependency table 200 even when some dependencies 201 and 203 in whole, or in part, duplicate other dependencies 201 and 203. When pages 140 are removed from page cache 110, dependency manager 116 can delete dependencies 201 and 203 corresponding to the particular removed pages 140. Thus, FIG. 7 illustrates certain aspects of dependencies 201 and 203. When pages 140 are modified, dependency manager 116 can overwrite dependencies 201 and 203 with correspondingly modified dependencies 201 and 203.

Figure 8:
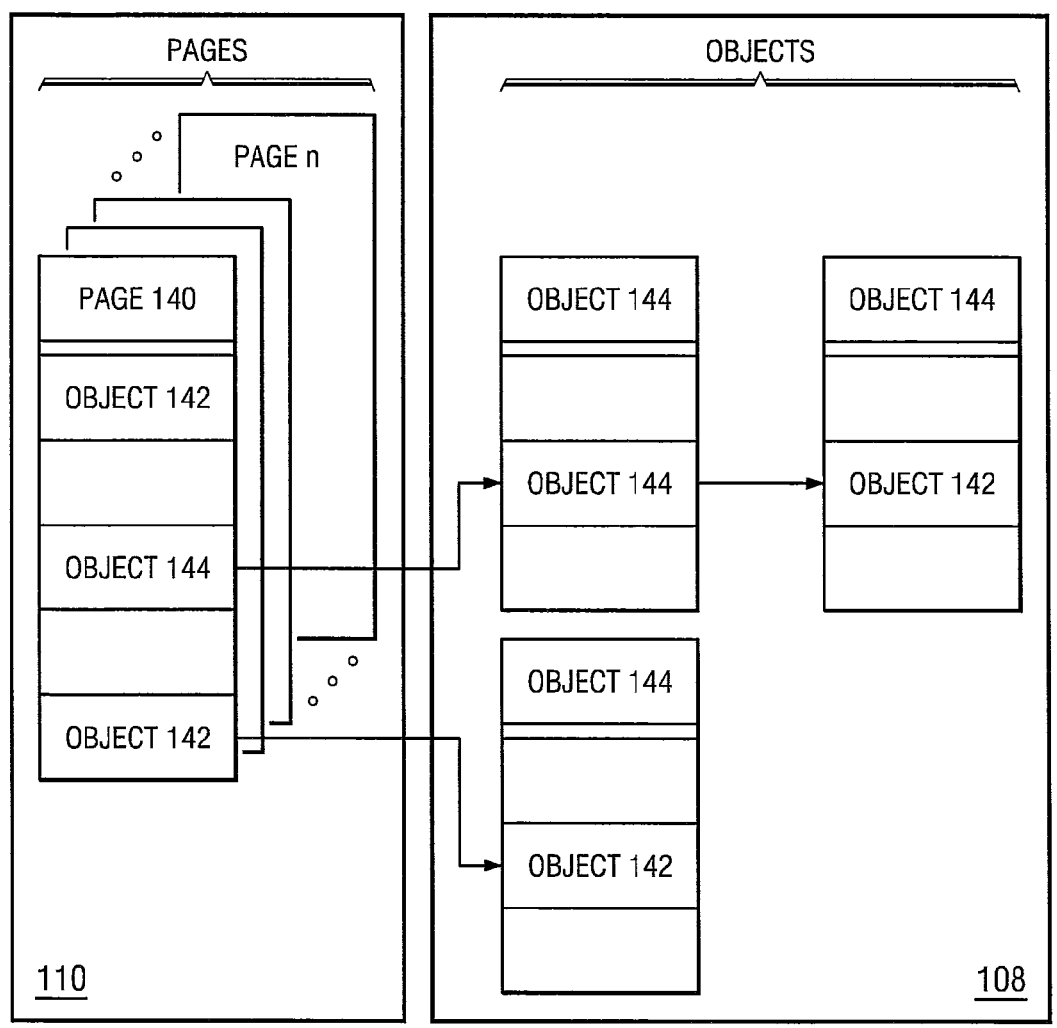
FIG. 8 illustrates the relationship between pages stored in one embodiment of a page delivery cache and objects stored in one embodiment of a content database.

FIG. 8 illustrates the relationship of objects stored at one embodiment of content database 108 and pages stored at one embodiment of page cache 110. Content database 108 can include various objects 142 and 144 on which page 140 (in page cache 110) may depend. Content database 108 can reflect the hierarchical nature of many cached pages 140 and objects 142 and 144. Some objects 142 and 144 may be relatively simple in that they depend on no other objects 142 and 144. Other objects 142 and 144 can depend on yet other objects 142 and 144. Still other objects such as object 142 and 144 may depend on other objects such as object 142 and 144 which can depend on still other objects 142 and 144. Nested dependencies, such as nested dependency 228 (see FIG. 7), can describe objects 142 and 144 which depend on other objects 142 and 144 and, through object 142 and 144, can depend on still other objects 142 and 144. Thus, when any of objects 142 and 144, on which cached page 140 might depend, is modified in content database 108, cached page 140 in page cache 110 can become stale.

With reference again to FIG. 4, system 100 of some embodiments can operate to create, manage, deliver, invalidate, and regenerate pages 140. End users can access user devices 102 to request content from content delivery system 122. The requested content may comprise a plurality of pages which may or may not be in page cache 110. When a particular requested page is in page cache 110, request handler 103 can service the request by returning cached page 140 from page cache 110 to user device 102. When a requested page is not in page cache 110, request handler 103 can forward the request for page generation. Page generator 104 can build the requested page using objects 142 and 144 stored in content database 108 and forward the newly generated page to capture filter 105. Various dependencies 201 and 203 discovered at page creation time by page generator 104 can also be forwarded to capture filter 105. Capture filter 105 can pass the newly generated page 140 and its dependencies 201 and 203 to dependency manager 116 and request handler 103. Request handler 103 can then pass the requested page 140 to user device 102, thereby satisfying the request. Dependency manager 116 can store dependencies 201 and 203 in dependency database 118 and forward the newly generated page 140 to cache manager 112 as described above.

Content management system 124 can allow certain actors 120 to create, maintain, modify, update, and delete content including objects 142 and 144 stored in content database 108. Content management system 124 can publish managed content to a deployment agent at the deployment stage. In some embodiments, this deployment agent incorporates invalidation generator 114. In some embodiments, invalidation generator 114 can have access to a version of the managed content or some versioning information of the managed content. In some embodiments, invalidation generator 114 may store a version of the managed content or some versioning information locally at the deployment stage.

Invalidation generator 114 may determine, based on the modifications to objects 142 and 144, what, if any, invalidation events should be produced and sent to dependency manager 116 of content delivery system 122. More specifically, by comparing the newly published content with the previous version, invalidation generator 114 can determine whether one or more objects 142 and 144 have been modified since the last publication. In some embodiments, for each object modification, invalidation generator 114 can produce and send to dependency manager 116 an invalidation event correspondingly.

Dependency manager 116 can receive the invalidation events from invalidation generator 114 and store them in a queue or other data structure. By comparing object modification information contained in the invalidation events and dependency information stored in dependency database 118, dependency manager 116 can determine if any page 140 is to be invalidated based on its dependency on an object that has been modified. In some embodiments, a single page 140 can be invalidated based on a single invalidation event. For each page 140 that is to be invalidated, dependency manager 116 can output a page invalidation notification to cache manager 112 accordingly.

In operation, system 100 can create new versions of pages 140, invalidate cached pages 140, and regenerate pages 140.

In a cache hit scenario, request handler/cache reader 103 can serve a particular requested page 140 from page cache 110 via cache manager 112. In a cache miss scenario, a particular requested page 140 cannot be found in page cache 110). In such cases, request handler 103 can request that page generator 104 generate the particular requested page 140. In generating the requested page 140, page generator 104 can determine dependencies 201 and 203 for the requested page 140. Page generator 104 can send the particular requested page 140 and corresponding dependencies 201 and 203 to request handler 103 via capture filter 105. Request handler 103 can serve that page 140 to user device 102. Capture filter 105 can forward the newly generated page 140 to dependency manager 116 along with dependencies 201 and 203. Dependency manager 116 can store dependencies 201 and 203 in dependency database 118 and forward the newly generated page 140 to cache manager 112. Cache manager 112 can then write the recently requested, newly generated page 140 to page cache 110, thereby overwriting stale page 140. On the next request for that same particular page 140, request handler 103 can serve that particular page 140 from page cache 110. Page 140 may reside in page cache 110 for some time during which one or more objects 142 and 144 in content database 108 may be modified or otherwise updated.

When invalidation generator 114 detects that a modification has occurred to a particular object 155, it can generate an invalidation event and send it to dependency manager 116. Dependency manager 116 can receive the invalidation event and check dependency database 118 for and all pages 140 that might depend on object 155. In cases in which a particular page 140 depends on object 155, dependency manager 116 can send cache manager 112 a page invalidation notification indicating that that cached page 140 may have become invalid. Cache manager 112 can request page generator 104 to regenerate a new version of page 140. Page generator 104 then regenerates page 140 and determine page dependencies as described above.

Page generator 104, in regenerating page 140, can read objects 142 and 144 (including object 155) from content database 108 via content manager 106. In some situations, page generator 104 might only read object 155 which has been modified since page 140 was last regenerated. In any case, at some time later, page generator 104 can finish regenerating a new version of page 140 and send it to request handler 103.

After page 140 is regenerated, cache manager 112 can replace cached page 140 with regenerated page 140 in page cache 110. The regenerated page 140 or a version thereof can be served to requesting users via request handler 103. In the meantime, though, object 155 (or some other object 142 or 144 on which the regenerated version of page 140 might depend) may have been modified again by some actor 120. Thus, page 140 may be invalid again even before 1) page generator 104 finishes regenerating it; 2) request handler 103 serves regenerated page 140 to some end user; or 3) cache manager 112 writes regenerated page 140 to page cache 110. The object modifications occurring during page generation can be deemed "overlapping modifications".

Some embodiments can include provisions for preventing overlapping modifications from causing invalidated pages 140 to be written to page cache 110. More particularly, when page generator 104 begins regenerating new versions of pages 140 (or begins generating new pages 140), page generator 104 can notify dependency manager 116 that it has begun a page generation session associated with certain pages 140 and objects 142 and 144. Dependency manager 116 can register such a regeneration session and monitor incoming invalidation events for overlapping modifications affecting objects 155 on which page 140 might depend (and for other modifications affecting page 140 if desired).

When dependency manager 116 receives a second, and overlapping, invalidation event during the session, dependency manager 116 can retain the previous and current invalidation events rather than discarding them. In some embodiments, dependency manager 116 may store incoming invalidation events locally, in dependency database 118, or in some other data structure. In the meantime, page generator 104 can finish regenerating a new version of the particular affected page 140 and notify dependency manager 116 that the regeneration session is complete. Page generator 104 can send dependency manager 116 regenerated page 140 and dependencies 201 and 203 associated therewith (via capture filter 105).

Dependency manager 116 can receive regenerated page 140 and dependencies 201 and 203 from page generator 104 and determine, based on invalidation events accumulated during the session and dependency information stored in dependency database 118, if any overlapping object modifications have occurred during the session. If so, the newly generated page may be invalidated.

As discussed previously, in some embodiments, dependency manager 116 can maintain a list (or other structure) in dependency database 118 pertaining to object modifications. Thus, dependency manager 116 can traverse the list back to such time as when page generator 104 began the page regeneration session searching for overlapping modifications. When dependency manager 116 determines that at least one overlapping object modification exists, dependency manager 116 can request that cache manager 112 invalidates the subject page via a page invalidation notification. Cache manager 112 can request invalidated pages 140 be regenerated as described above.

In some embodiments, when dependency manager 116 determines that no overlapping modifications exist, dependency manager 116 can notify cache manager 112 to write the regenerated page 140 to page cache 110. With continuing reference to FIG. 10, writing pages 140 to page cache 110 can involve some amount of time. As a result, it can be the case that some overlapping object modifications might have occurred while new versions of regenerated pages 140 are being written to page cache 110. In such situations, regenerated pages 140 can be invalid even before they are written to page cache 110, served to user device 102, etc.

Thus, in some embodiments, instead of having regenerated pages 140 written to page cache 110, dependency manager 116 can notify cache manager 112 to store a regenerated page 140 in a temporary location in page cache 110. Cache manager 112 can acknowledge the temporary storage requested by dependency manager 116. Dependency manager 116 can then determine whether overlapping modifications have occurred during the write operation. If so, dependency manager 116 can notify cache manager 112 to invalidate the particular affected page 140. Cache manager 112 can request regeneration of the invalidated page 140 which is cached at a temporary location. If no overlapping object modifications have occurred while writing the regenerated page 140 to a temporary location, dependency manager 116 can request that cache manager 112 move the regenerated page 140 to a permanent location in page cache 110. In some embodiments, the above described process can be repeated.

Although embodiments have been described in detail herein, it should be understood that the description is by way of example only and is not to be construed in a limiting sense. It is to be further understood, therefore, that numerous changes in the details of the embodiments and additional embodiments will be apparent, and may be made by, persons of ordinary skill in the art having reference to this description. It is contemplated that all such changes and additional embodiments are within scope of the claims below and their legal equivalents.

What is claimed is:

1. A system for invalidating cached pages in a network environment, the system comprising:
a cache manager embodied on non-transitory computer readable memory including computer instructions executable for managing a page cache in the network environment;
an invalidation generator embodied on non-transitory computer readable memory including computer instructions executable for generating at least one invalidation event based on a modification to at least one object stored in a content database in the network environment; and
a dependency manager embodied on non-transitory computer readable memory including computer instructions executable for:
generating at least one page invalidation notice based on the at least one invalidation event generated by the invalidation generator; and
forwarding the at least one page invalidation notice to the cache manager, wherein the at least one page invalidation notice generated by the dependency manager notifies the cache manager that at least one page stored in the page cache managed by the cache manger has been invalidated based on a dependency hierarchy associated with the at least one object whose modification has been detected and wherein the cache manager references the invalidated at least one page stored in the page cache as having been invalidated based on the at least one page invalidation notice generated by the dependency manager.

2. The system of claim 1, wherein the cache manager is operable to send a page regeneration request to a page generator operating in the network environment and update an invalidated page in the page cache with a regenerated page received from the page generator.

3. The system of claim 2, wherein the page regeneration request is sent by the cache manager subsequent to a request for content received from a client device.

4. The system of claim 1, wherein the invalidation generator is operable to locally store content versioning information associated with the content database.

5. The system of claim 1, wherein the invalidation generator is operable to compare newly published content with a last publication of the content and determine whether any object stored in the content database has been modified since the last publication of the content.

6. The system of claim 1, wherein each of the at least one invalidation event corresponds to an object modification.

7. The system of claim 1, wherein the dependency manager is operable to receive the at least one invalidation event generated by the invalidation generator and store the at least one invalidation event generated by the invalidation generator in a queue or data structure.

8. A method, comprising:
managing a page cache in a network environment, the page cache managed by a cache manager embodied on non-transitory computer readable memory;
generating at least one invalidation event based on a modification to at least one object stored in a content database in the network environment, the at least one invalidation event generated by an invalidation generator embodied on non-transitory computer readable memory;
generating at least one page invalidation notice based on the at least one invalidation event generated by the invalidation generator, the at least one page invalidation notice generated by a dependency manager embodied on non-transitory computer readable memory;
forwarding, by the dependency manager, the at least one page invalidation notice to the cache manager, wherein the at least one page invalidation notice generated by the dependency manager notifies the cache manager that at least one page stored in the page cache managed by the cache manger has been invalidated based on a dependency hierarchy associated with the at least one object whose modification has been detected; and
referencing, by the cache manager, the invalidated at least one page stored in the page cache as having been invalidated based on the at least one page invalidation notice generated by the dependency manager.

9. The method according to claim 8, further comprising:
the cache manager sending a page regeneration request to a page generator operating in the network environment; and
the cache manager updating an invalidated page in the page cache with a regenerated page received from the page generator.

10. The method according to claim 9, wherein the page regeneration request is sent by the cache manager subsequent to a request for content received from a client device.

11. The method according to claim 8, further comprising:
the invalidation generator locally storing content versioning information associated with the content database.

12. The method according to claim 8, further comprising:
the invalidation generator comparing newly published content with a last publication of the content; and
the invalidation generator determining whether any object stored in the content database has been modified since the last publication of the content.

13. The method according to claim 8, wherein each of the one or more invalidation events corresponds to an object modification.

14. The method according to claim 8, further comprising:
the dependency manager receiving the at least one invalidation event generated by the invalidation generator; and
the dependency manager storing the at least one invalidation event generated by the invalidation generator in a queue or data structure.

15. A computer program product comprising at least one non-transitory computer readable medium storing computer instructions executable by at least one processor to implement:
a cache manager for managing a page cache in a network environment;
an invalidation generator for generating at least one invalidation event based on a modification to at least one object stored in a content database in the network environment;
a dependency manager for:
generating at least one page invalidation notice based on the at least one invalidation event generated by the invalidation generator; and
forwarding the at least one page invalidation notice to the cache manager, wherein the at least one page invalidation notice generated by the dependency manager notifies the cache manager that at least one page stored in the page cache managed by the cache manger has been invalidated based on a dependency hierarchy associated with the at least one object whose modification has been detected and wherein the cache manager references the invalidated at least one page stored in the page cache as having been invalidated based on the at least one page invalidation notice generated by the dependency manager.

16. The computer program product of claim 15, wherein the cache manager is operable to send a page regeneration request to a page generator operating in the network environment and update an invalidated page in the page cache with a regenerated page received from the page generator.

17. The computer program product of claim 16, wherein the page regeneration request is sent by the cache manager subsequent to a request for content received from a client device.

18. The computer program product of claim 15, wherein the invalidation generator is operable to locally store content versioning information associated with the content database.

19. The computer program product of claim 15, wherein the invalidation generator is operable to compare newly published content with a last publication of the content and determine whether any object stored in the content database has been modified since the last publication of the content.

20. The computer program product of claim 15, wherein each of the at least one invalidation event corresponds to an object modification.

* * * * *